United States Patent [19]

Mathews

[11] Patent Number: 5,292,436

[45] Date of Patent: Mar. 8, 1994

[54] TAPERED BED FILTRATION APPARATUS

[75] Inventor: Alexander P. Mathews, Manhattan, Kans.

[73] Assignee: Kansas State University Research Foundation, Manhattan, Kans.

[21] Appl. No.: 882,516

[22] Filed: May 13, 1992

[51] Int. Cl.$^5$ .................................................. B01D 24/46
[52] U.S. Cl. ...................................... 210/275; 210/290
[58] Field of Search ........................ 210/287, 290, 275

[56] References Cited

U.S. PATENT DOCUMENTS

| | | | |
|---|---|---|---|
| 17,987 | 8/1857 | Thompson | 210/290 |
| 293,745 | 2/1884 | Hyatt | 210/290 |
| 331,790 | 12/1885 | Hood | 210/290 |
| 1,759,013 | 5/1930 | Lancaster | 210/290 |
| 3,471,025 | 10/1969 | Dobson | 210/290 |

*Primary Examiner*—Ivars Cintins
*Attorney, Agent, or Firm*—Hovey, Williams, Timmons & Collins

[57] ABSTRACT

A filter apparatus for filtering fluids such as gases or liquids includes a casing defining an inlet and an outlet, and having a peripheral wall extending between the inlet and outlet. The peripheral wall defines a chamber having a longitudinal axis and a cross-sectional area, when viewed in the direction of the longitudinal axis, which increases between the inlet and the outlet. A bed of particulate filtering media is disposed within the chamber, the media ranging in size between relatively large particles disposed adjacent the inlet and smaller particles disposed closer to the outlet. Preferably, the size of the particles is chosen based upon the relationship between the lifting force exerted on the particles by a fluid flowing upward through the chamber and the weight of the particles. As the lifting force exerted on the particles varies, due to varying velocity of the fluid passing upward through the chamber, the size of the particles is also varied at a corresponding rate so that all particles are effected equally by the lifting force of the fluid and mixing of the particles is inhibited.

10 Claims, 5 Drawing Sheets

TAPERED BED FILTRATION APPARATUS

BACKGROUND OF THE INVENTION

1. Field of the Invention

The present invention relates generally to devices for filtration of fluids, and in particular to an apparatus for filtering fluids through the use of a casing defining a chamber of variable cross-sectional area along the length thereof for receiving a bed of stratified particulate filtering media.

2. Discussion of the Prior Art

It is well known to filter water and other fluids by passing it through a bed of porous medium, such as sand, anthracite or a combination of both. Filtration is used to produce water of suitable quality for drinking and most industrial uses, including process fluid filtration, waste water treatment, water re-use, gas cleaning, boiler makeup or special processing cooling purposes.

The purpose of filtration is to remove particulate matter from the fluid. More sophisticated filtration systems are needed where it is desired to remove the highest percentage of particulate matter. Filtration involves adsorption, straining, sedimentation, interception, diffusion and inertial compaction.

Conventional filters may be of either gravity or pressure construction. In most such filters, the flow of fluid is downward. Sand or anthracite is usually the filter medium in a bed consisting of either one or two grades of sand or anthracite, with a total depth of 15 to 30 inches. Further, a gravel bed supports the filter medium, and prevents fine sand or anthracite from passing into the underdrain system and distributes backwash water. The supporting bed consists of $\frac{1}{8}$ to $1\frac{1}{2}$ inch gravel in graded layers to a depth of 12 to 16 inches.

One variant of the conventional filter is a stratified upflow filter. In stratified upflow filters, a single medium of graded sand is often used, with the finest sand grade at the top of the bed, and the coarsest sand below. Gravel is generally located at the bottom of the unit retained in a fixed position by grids. The gravel is used to ensure proper water distribution during the service cycle. During operation, larger, coarse particles are removed at the bottom of the bed, while smaller particles are allowed to penetrate further into the media. Typical service flow rates are 5 to 10 gpm/sq.ft.

Conventional fluid filters of the type described above perform adequately in most environments, but experience common problems. One of the principal problems which must be addressed by all filters of this type is that, while the obvious purpose of the filter is to trap as much particulate matter as possible through the initial contact of the water with the filtration media, at the same time some penetration of the media is absolutely essential to prevent rapid loss of pressure head. In other words, in order to promote efficiency, it is beneficial to strike the most positive balance between the highest rate of flow and the lowest loss of pressure head on the one hand, and the highest degree of effluent quality on the other. Conventional filters frequently have difficulty in achieving a high degree of efficiency.

A second problem, related to the first, is created by the need to backwash the filter system in order to remove trapped particulate matter. Because of the relative inefficiency of many conventional filtration systems, it is necessary to backwash such systems at short intervals in order to remove the particles and restore the filter to its maximum efficiency. This frequent backwashing further reduces efficiency by removing the filtration system from its filtering cycle.

Yet another difficulty is presented by the backwashing itself. That is, each backwashing cycle causes fluidization of the particulate media, causing the smaller media to migrate within the chamber and mix with the larger media. This migration is aggravated by the need for frequent backwashing in less efficient conventional filters. The net result of the mixing is frequently to upset the stratification of the bed, thus further decreasing the efficiency of the filter.

OBJECTS AND SUMMARY OF THE INVENTION

It is an object of the present invention to provide a tapered bed filtration apparatus in which a tapered chamber encloses filtration media so stratified that large particles are placed at the fluid inflow end, and filtration particles of increasingly smaller size extend therefrom toward the outflow end of the chamber.

It is a further object of the present invention to provide a tapered bed filtration apparatus wherein the angle of taper of the chamber is such that during the filtration cycle, the flow of fluid is characterized by uniform decreased velocity with resultant reduced pressure head drop.

It is yet another object of the present invention to provide a tapered bed filtration apparatus wherein the angle of taper of the chamber is such that during the backwash cycle, fluid flow in an upward direction is characterized by a changing velocity which varies in accordance with the change in cross-sectional area of the chamber, as required to maintain the conservation of mass, facilitating the retention of the filtration media in the proper stratification.

Another object of the present invention is to provide a tapered bed filtration apparatus in which the configuration of the invention promotes longer operating times between backwashing cycles, and thus greater efficiency of the filtration system.

In accordance with the invention, a filter apparatus comprises a casing defining an inlet and an outlet, and having a peripheral wall extending between the inlet and outlet. The peripheral wall defines a filtration chamber having a longitudinal axis and a cross-sectional area, when viewed in the direction of the longitudinal axis, which increases between the inlet and the outlet.

A bed of particulate filtering media is provided within the chamber of the filter apparatus. The media range in size between relatively large particles and relatively small particles, the media being distributed by particle size within the chamber, with the large particles being disposed adjacent the inlet and with smaller particles being disposed closer to the outlet.

The casing is positioned vertically upright, and the size of the particles is chosen based upon the relationship between the lifting force exerted on the particles by a fluid flowing upward through the chamber and the weight of the particles. As the lifting force exerted on the particles varies, due to varying velocity of the fluid passing upward through the chamber, the size of the particles is also varied at a corresponding rate so that all particles are affected equally by the lifting force of the fluid and mixing of the particles is inhibited.

By providing this construction of a filter apparatus, numerous advantageous results are achieved. For example, by stratifying the particles within the bed with large particles disposed within the smallest portion of the chamber and with particles of decreasing size being provided within portions of the chamber of increasing size, the stratification of the particles is maintained, even during backwashing when the bed is fluidized, and mixing of the particles is inhibited. Further, the objects of the invention, as noted above, are achieved.

BRIEF DESCRIPTION OF THE DRAWING FIGURES

A preferred embodiment of the invention is described in detail below with reference to the attached drawing figures, wherein.

DETAILED DESCRIPTION OF A PREFERRED EMBODIMENT

Figure 1:
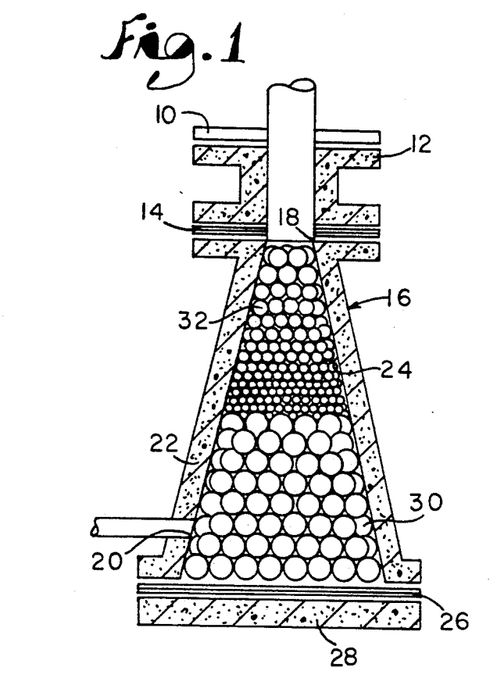
FIG. 1 is a side elevational view of a reverse stratified tapered bed filtration apparatus, constructed in accordance with a first preferred embodiment of the present invention.

A reverse stratified tapered bed filtration apparatus constructed in accordance with a preferred embodiment of the present invention is illustrated in FIG. 1.

The apparatus includes an external gasket 10 disposed above an upper casing 12. The upper casing 12 is separated by an intermediate gasket 14 from an upright casing 16. The casing 16 includes an inlet 18 formed at the upper end thereof, an outlet 20 disposed adjacent the lower end, and a peripheral wall 22 extending between the inlet and outlet. The peripheral wall defines a filtration chamber 24 having a longitudinal axis and a cross-sectional area, when viewed in the direction of the longitudinal axis, which increases between the inlet 18 and the outlet 20. A lower gasket 26 separates the casing 16 from a base structure 28.

Preferably, the cross-sectional area of the chamber increases continuously from a small area at the inlet 18 to a larger area at the outlet 20, and best results have been found where the rate of change in the area is substantially constant, e.g. where the shape of the chamber is pyramidic or frustoconical.

The casing 16, upper casing 12, and base structure 28 are formed of any material from which conventional filter devices are constructed, such as concrete for larger devices and stainless steel or other alloys or plastics for corrosive fluids and for smaller applications.

The chamber 24 is partially filled at its lower end by support material 30, such as gravel or the like, having a particle diameter in the range of from about 2-60 mm. Underdrains may be used below the gravel or alone to convey the fluid out of the filter and to distribute the fluid uniformly during backwash. The support material 30 underlies a filtration bed 32 composed of at least one type of particulate filtering media. The media ranges in size between relatively large particles and relatively small particles, and is stratified in the bed with the largest particles being disposed proximal the inlet and with the smallest particles resting against the support material.

Depending upon the application, the apparatus may employ filtration media having a size in the range of from about 100–2000 microns in diameter, with any desired number of different strata of particles provided. For example, in an application where slow filtration is to be carried out, the media range in size from about 100–800 microns in diameter, while in a fast filtration system the media size may range from about 500–2000 microns in diameter. For application as a roughing gravel filter, media sizes ranging from 1–40 mm may be used.

Further, by selecting the filtration media from a number of different materials such as sand or athracite, with each material having a density different from the other materials chosen, it is possible to provide a multi-media filtration system, wherein each material is separated from an adjacent material, and the particles of each material are stratified relative to each other by size, with the larger particles located closer to the inlet than the smaller particles.

The reverse stratified tapered bed filtration apparatus illustrated in FIG. 1 utilizes gravity flow for filtration. In use, fluid, which may be either a gas or liquid, passes downward through the chamber 24 from the inlet 18 to the outlet 20 and suspended particles within the fluid are filtered through contact with the filtration media in the bed 32. Because of the stratification of the bed, the suspended particles in the fluid being filtered penetrate the bed more fully than occurs in conventional filtering devices, thereby increasing filtration efficiency.

As a result of the configuration of the present invention, filtration velocities decrease uniformly in the direction of flow during normal filtration. This is brought about by the cooperative interaction of the stratification of the media and the taper of the chamber 24. That is, the fluid flows relatively rapidly downward into the media because the larger media are at the top of the bed 32, thus promoting more rapid fluid penetration. As the fluid penetrates the filtration bed 32, however, the natural tendency is for the pressure head to rapidly drop when the fluid contacts and begins to penetrate the smaller media. This is because the media fills a substantially larger proportion of the space defined by the bed such that the amount of void space decreases. Also, as the filtration media strains and adsorbs a progressively larger amount of particulate material, a further drop in the pressure head results. Nevertheless, the rapid pressure head drop characteristic of more conventional filters is avoided in the present invention by the outward taper of the chamber 24, because the tendency toward pressure head drop is counteracted by the ability of the fluid to expand outwardly as it flows downward. The uniform decrease in filtration velocity which occurs also results in better effluent quality.

The configuration of the present invention also affects its operational characteristics during the backwash cycle, which involves upward fluid flow from the outlet toward the inlet in the first described preferred embodiment. Again, the cooperative interaction between the stratified filter media and the taper of the chamber 24 results in increased efficiency. During the backwash cycle, fluid entering the chamber 24 from the fluid outlet 20 experiences a uniform increased velocity as it moves upward. This flow characteristic is promoted by two factors. First, the fluid naturally gains more velocity as it moves from the smaller media upward through the larger media toward the fluid inlet 18. Secondly, fluid velocity is also naturally increased by the progressive narrowing of the chamber 24 toward the top thereof in accordance with the requirements of the law of conservation of mass.

In the apparatus of the present invention illustrated in FIG. 1, the combination of uniform increased fluid velocity and the progressive narrowing of the chamber 24 promotes continued stratification within the filtration bed 32. On the one hand, because the increased fluid velocity is uniform in the preferred embodiment, there is no tendency for one portion or several portions of the stratified filter bed 32 to break away from the main body thereof. On the other hand, the progressive narrowing of the tapered chamber, and the fact that the entire chamber is filled with either support or filtration media, acts to prevent excessive movement of media from its optimal stratification. Therefore, media stratification is encouraged even during the backwash cycle where fluidization occurs. This promotes efficiency in both the service and backwash cycles, and therefore lower operating costs.

In order to ensure that inter-mixing of the various sized particles within the bed does not occur, the distribution of filtration media particles by size is based on several known relationships.

In particular, where a single filtration media is selected, or for each of a plurality of different media, the size of the particles occupying the chamber within any given cross-section of the chamber taken along the longitudinal axis is chosen based upon the relationship between the lifting force exerted on the particles by a fluid flowing upward through the chamber during backwash from the outlet toward the inlet and the weight of the particles, wherein as the lifting force exerted on the particles increases with decreasing cross-sectional area of the chamber, due to the increasing velocity of the fluid passing upward through the chamber, the size of the particles increases at a corresponding rate so that all particles are effected equally by the lifting force of the fluid, and mixing of the particles is inhibited.

For example, by relying upon the known conditions within the bed at the point at which minimum fluidization occurs during backwash, it is possible to calculate the necessary diameter for particles within each particular cross-section of the chamber so that all of the particles become fluidized at essentially the same time, and are effected substantially equally by changes in the rate of flow of fluid during backwash.

Figure 2:
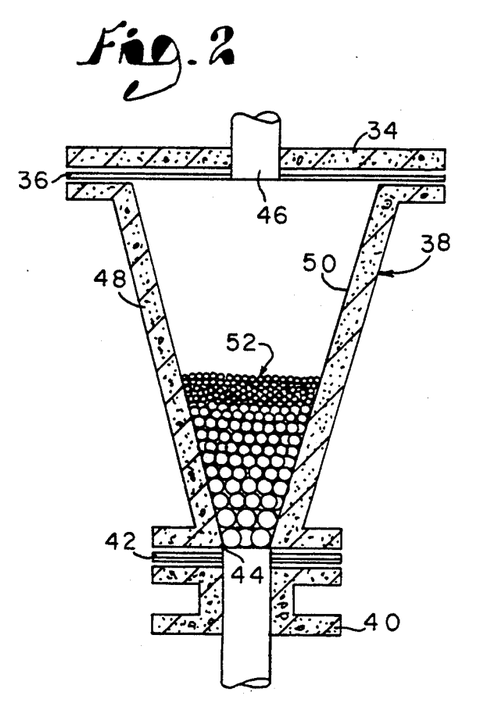
FIG. 2 is a side elevational view of a stratified tapered bed filtration apparatus, constructed in accordance with a second preferred embodiment of the present invention.

A stratified tapered bed filter apparatus constructed in accordance with a second preferred embodiment of the present invention is illustrated in FIG. 2. The filter apparatus has an upper casing 34, an upper gasket 36 separating the upper casing from a main casing 38, a flow distributor 40 positioned beneath the casing, and a lower gasket 42 separating the casing from the flow distributor.

The casing 38 includes an inlet 44 located at the bottom thereof and an outlet 46 at the top, and a peripheral wall 48 extending between the inlet and outlet and defining a filtration chamber 50 having a longitudinal axis and a cross-sectional area, when viewed in the direction of the longitudinal axis, which increases between the inlet and the outlet.

Preferably, the cross-sectional area of the chamber increases continuously from a small area at the inlet 44 to a larger area at the outlet 46, and best results have been found where the rate of change in the area is substantially constant, e.g. where the shape of the chamber is pyramidic or frustoconical.

A filtration bed 52 composed of at least one type of particulate filtering media is provided within the chamber and fills at least the lower third of the volume of the chamber. The chamber 48 may be partly filled at its lower end by support material such as gravel or the like. Underdrains may be used in some fluid filtration applications below the gravel layer. The media is stratified within the bed and ranges in size between relatively large particles and relatively small particles, with the largest particles being disposed proximal the inlet and with the smallest particles disposed at the top of the bed. A free space 54 is generally disposed between the filtration bed 52 and the upper end of the chamber.

During normal operation of the preferred construction illustrated in FIG. 2, fluid, which may be either a gas or liquid, passes upward through the chamber from the inlet 44 to the outlet 46 and suspended particles within the fluid are filtered through contact with the filtration media in the bed 52. Because of the stratification of the bed, the suspended particles in the fluid being filtered penetrate the bed, thereby increasing filtration efficiency.

During backwash, fluid is passed from the inlet and travels up through the chamber toward the outlet. However, the fluid is passed through the chamber at a much higher velocity than that experienced during normal filtration, and fluidization of the bed results.

The preferred media sizes discussed above with reference to the embodiment illustrated in FIG. 1 apply equally to the embodiment of FIG. 2. Further, the distribution of the particles within the bed are calculated in the same manner as in the first described embodiment.

Specifically, the size of the particles occupying the chamber within any given cross-section of the chamber taken along the longitudinal axis is chosen based upon the relationship between the lifting force exerted on the particles by a fluid flowing upward through the chamber during backwash from the inlet toward the outlet and the weight of the particles, wherein as the lifting force exerted on the particles decreases with increasing cross-sectional area of the chamber, due to the decreasing velocity of the fluid passing upward through the chamber, the size of the particles decreases at a corresponding rate so that all particles are effected equally by the lifting force of the fluid, and mixing of the particles is inhibited.

For example, by relying upon the known conditions within the bed at the point at which minimum fluidization occurs during backwash, it is possible to calculate the necessary diameter for particles within each particular cross-section of the chamber so that all of the particles become fluidized at essentially the same time, and are effected substantially equally by changes in the rate of flow of fluid during backwash.

Where backwashing in the fluidized state is not required, such as in roughing gravel filter applications, a tapered filter bed constructed in accordance with the present invention which is oriented horizontally, with the cross-sectional area of the filter increasing in the direction of flow.

In order to demonstrate the effectiveness of a filter apparatus constructed in accordance with the present invention, the following comparative tests are provided.

COMPARATIVE TESTS

Example 1

Figure 3:
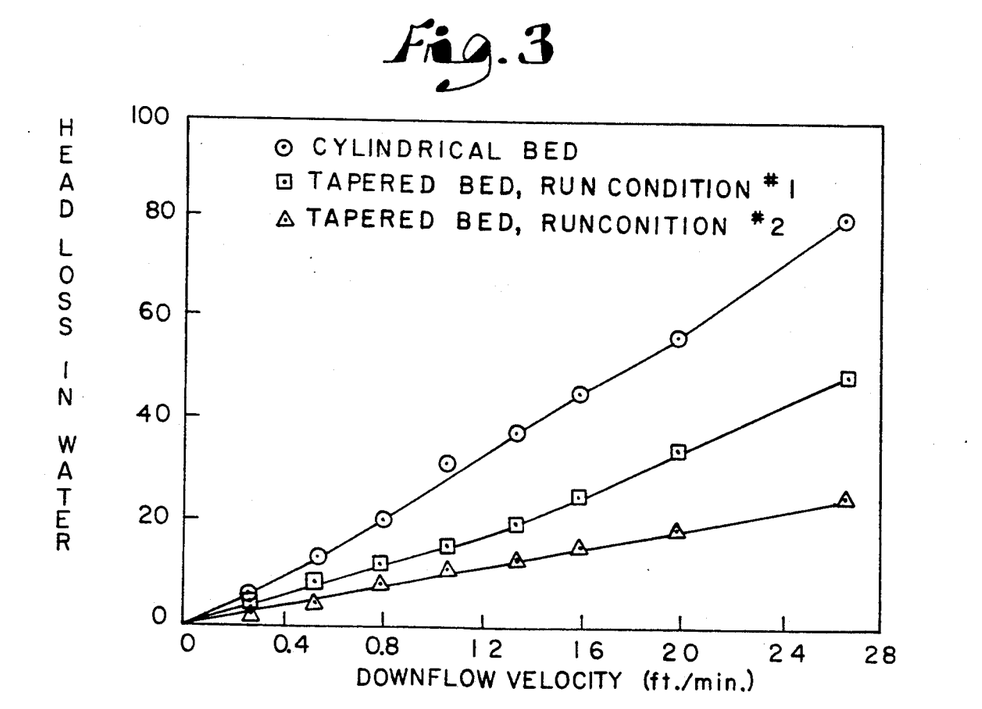
FIG. 3 is a diagram illustrating a comparison of relative pressure head drop between a conventional cylindrical filter and a reverse stratified tapered bed filtration apparatus constructed according to the present invention.

FIG. 3 illustrates the results of a comparison between a filter constructed according to the first preferred embodiment of the present invention and a conventional filter. The results pertaining to the conventional filter, which included a cylindrical bed of 2 inches in diameter, are shown in the line marked with circular reference points. Results relating to the structure of the preferred construction of the invention, and including the tapered filter bed, are designated in the remaining two lines.

Figure 4:
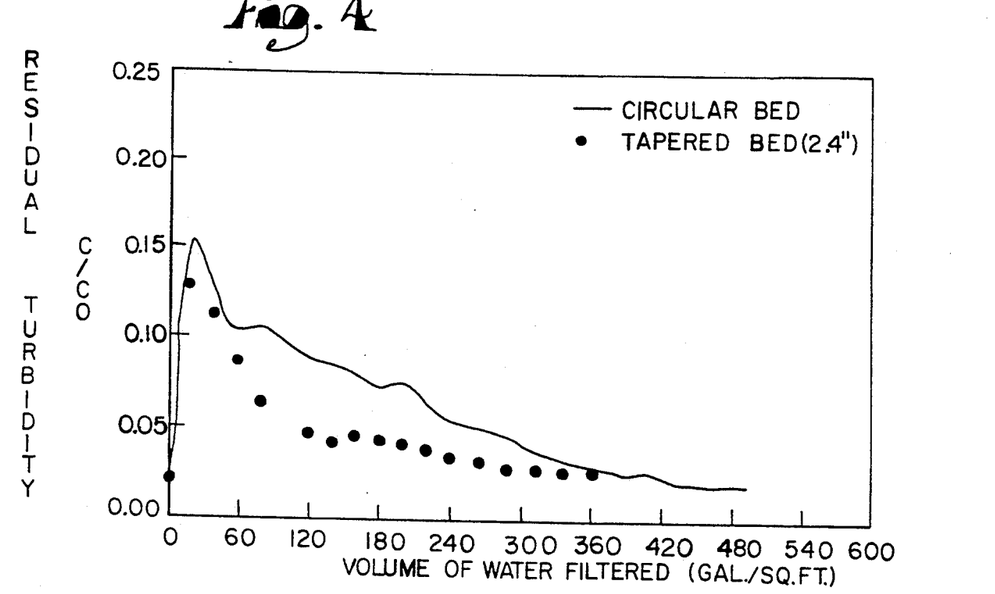
FIG. 4 is a diagram illustrating a comparison of relative turbidity breakthrough curves between a conventional cylindrical filter and a reverse stratified tapered bed filtration apparatus constructed according to the present invention, and both systems operated in the constant rate filtration mode.
Figure 5:
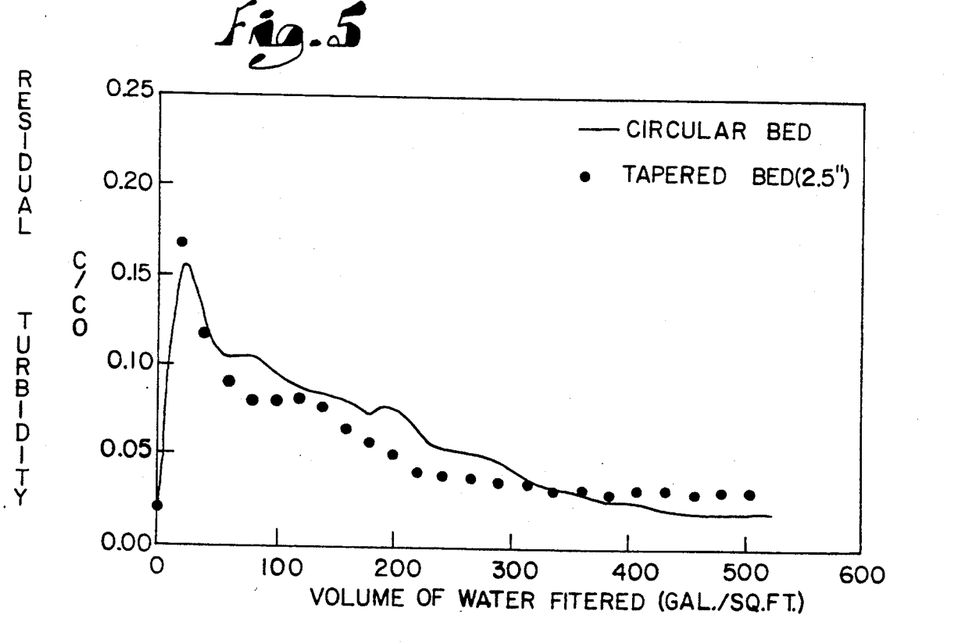
FIG. 5 is a diagram illustrating a second comparison of relative turbidity breakthrough curves between a conventional cylindrical filter and a reverse stratified tapered bed filtration apparatus constructed according to the present invention, and both systems operated in the constant rate filtration mode.

One device was constructed in accordance with the first preferred embodiment of the invention for the illustrations exemplified in FIGS. 3, 4 and 5. The casing of the device was constructed of plexiglass. The device had a height of 24 inch with square inlet and outlet sections. The width at inlet was 1 inch and the width at outlet was 3 inch. The device was operated under two different experimental run conditions corresponding to different bed heights and cross-sectional areas. In the first run the bed height was 12 inches with a 1.47×1.47 inch square section at the inlet and a 2.4×2.4 inch section at the outlet. The second run had a bed height of 9.4 inches with a 1.8×1.8 inch section at the inlet and a 2.5×2.5 inch section at the outlet.

The bed of filtration media was supported on a support layer of gravel and was composed of sand ranging in size from about 250–1000 microns in diameter, with the particles distributed by size within the chamber in accordance with the relationships discussed above. The effective size of the medium was 0.53 mm, and the uniformly co-efficient was 1.31.

The graph illustrated in FIG. 3, shows that the conventionally designed filter construction experienced a significantly greater pressure drop at a range of downflow velocities as compared with the pressure drop experienced in the reverse-stratified tapered filter beds constructed in accordance with the present invention. Thus, for example, the cylindrical filter bed lost 20 inches of water as the downflow velocity reached 0.8 ft./min., while in the worst case, the tapered bed lost 10 inches of water. As the velocity of its downward flow increased, so did this disparity; at a downward velocity of 2.8 ft./min., the conventional filter construction lost about 80 inches of water, while in the most favorable comparison, the tapered filters of the present invention lost slightly over 40 inches of water.

Example 2

A comparison of turbidity breakthrough curves as recorded in a conventional circular filter bed and a tapered filter bed constructed according to the present invention is reflected in FIG. 4. In this example, the cylindrical bed had a uniform diameter of 2 inches, while the tapered filter bed illustrated in Example 1, was operated under the first run conditions.

Identical media was used in each instance. A constant flow rate of 4 gpm/sq.ft. was maintained, along with a polymer dosage of 2 mg/liter. The polymer was MAGNIFLOC®, a filter conditioning polymer manufactured by American Cyanamid Co. of Wayne, N.J. Common tap water was used, with Kaolin of a known amount in suspension. In this example, residual turbidity decreased as the volume of water filtered increased. However, the fall in residual turbidity occurred much more quickly in the tapered bed of the present invention. Specifically, water in the tapered bed reached a residual turbidity of 0.05 after approximately 120 gal/sq.ft. had been filtered; water in the cylindrical bed did not reach this level of turbidity until about 300 gal/sq.ft. had been filtered.

Example 3

FIG. 5 depicts the results of a comparison identical to that discussed in Example 2 and shown in FIG. 4, except that in this example the embodiment of the present invention included the tapered filter bed illustrated in FIG. 1, operated under the second run conditions.

Again, residual turbidity decreased as the volume of water filtered increased. In this case, the profile relating to the performance of the cylindrical or circular filter bed was approximately the same as that developed in Example 2 and shown in FIG. 4. However, in this example, while the residual turbidity associated with the tapered filtered bed of the present invention was generally lower than the turbidity in the conventional filter bed, the relative disparity between them was generally less than the previous example.

Example 4

Figure 6:
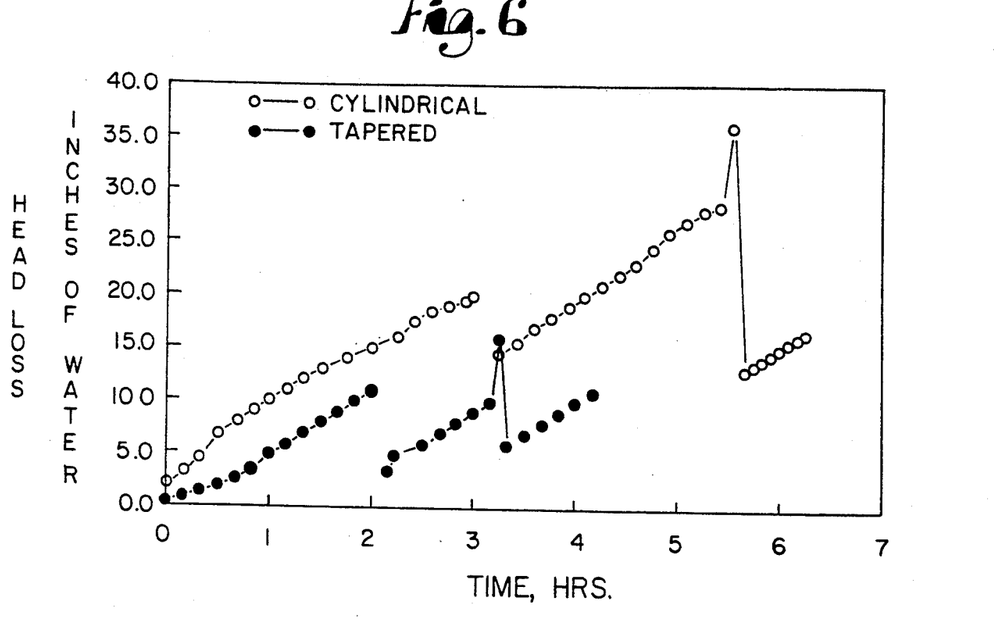
FIG. 6 is a diagram illustrating a second comparison of relative pressure head loss curves between a conventional cylindrical filter and a reverse stratified tapered bed filtration apparatus constructed according to the present invention, and both systems operated in the variable declining rate filtration mode.

A comparison of pressure head loss curves for variable declining rate filtration for two conventional cylindrical beds and two reverse-stratified tapered filter beds constructed according to the present invention is shown in FIG. 6. In this example, the head loss in inches of water was measured against time in hours, with a flow rate of 6 gpm/sq.ft. Two identical devices were constructed in accordance with the first preferred embodiment of the invention. They were both constructed of plexiglas with a height of 18 inches and square cross-sections. The width at the inlet was 1 inch and the width of the outlet was 2.5 inches. Media identical to that in Example 1 were used in both cylindrical and tapered beds. The two systems were operated in the variable declining rate filtration mode of operation with 15 mg/l of ferric sulfate as the conditioning agent. The diagram indicates that the pressure loss in the tapered bed was consistently lower than the head loss experienced where the conventional cylindrical bed was utilized, within a range of 5 to 10 inches of water.

It is noted at the spikes shown in FIG. 6 represent backwash cycles which were carried out when either effluent quality dropped below a predetermined level or when pressure drop exceeded a particular level, and was carried out simultaneously in all of the devices used in the example.

Example 5

Figure 7:
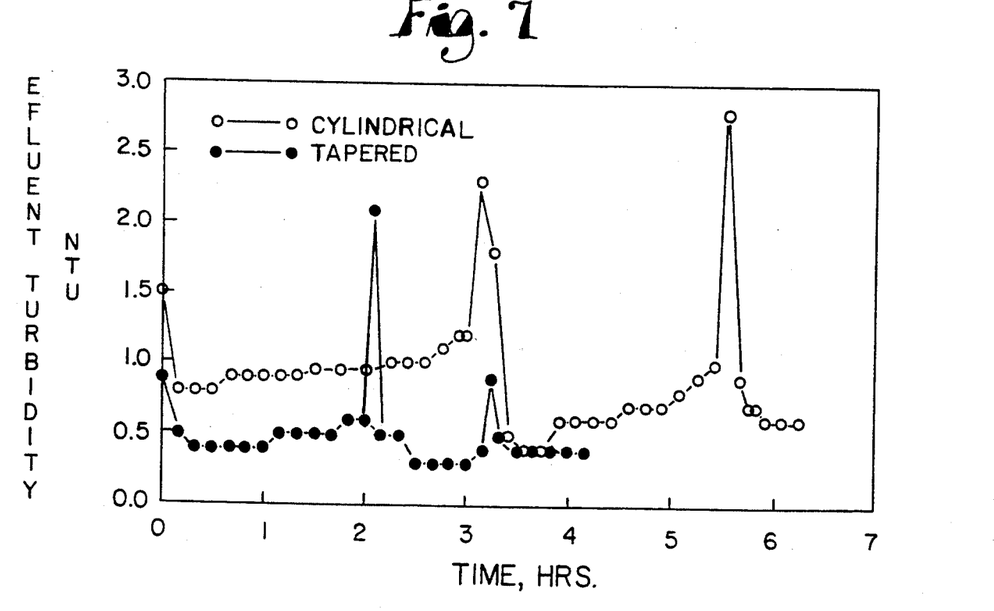
FIG. 7 is a diagram illustrating a comparison of relative effluent turbidity curves between a conventional cylindrical filter and a reverse stratified tapered bed filtration apparatus constructed according to the present invention, and both systems operated in the variable declining rate filtration mode.

FIG. 7 illustrates a comparison of effluent turbidity curves under variable declining rate filtration between two conventional cylindrical bed filters and two tapered bed filters of the present invention. As in Example 4, the flow rate in this example was 6 gpm/sq.ft., and the diameter of the tapered bed at the bottom of the casing was 2.5 inches as described in Example 4. In this example, the influent turbidity in the cylindrical bed measured 15 nephelometer turbidity units (NTU), while the influent turbidity in the tapered bed measured 17 NTU. As depicted in FIG. 7, although the influent turbidity was higher in the tapered bed than in the cylindrical bed, the effluent turbidity was in nearly all cases markedly lower in the tapered bed than in the conventional cylindrical bed.

Example 6

Figure 8:
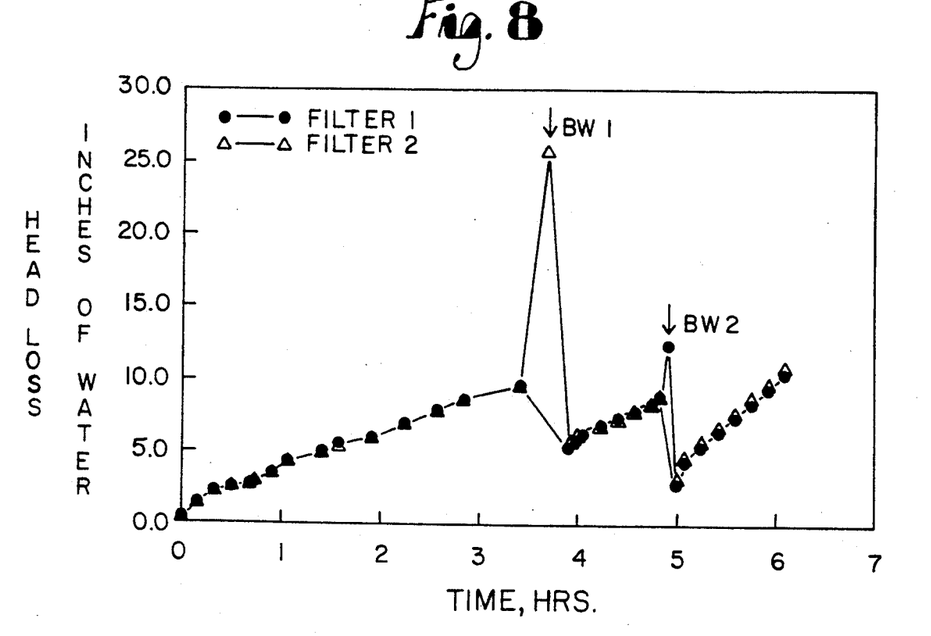
FIG. 8 is a diagram illustrating the relative pressure head loss curves for two conventional cylindrical filters used in the comparative tests described below, and both systems operated in the variable declining rate filtration mode.
Figure 10:
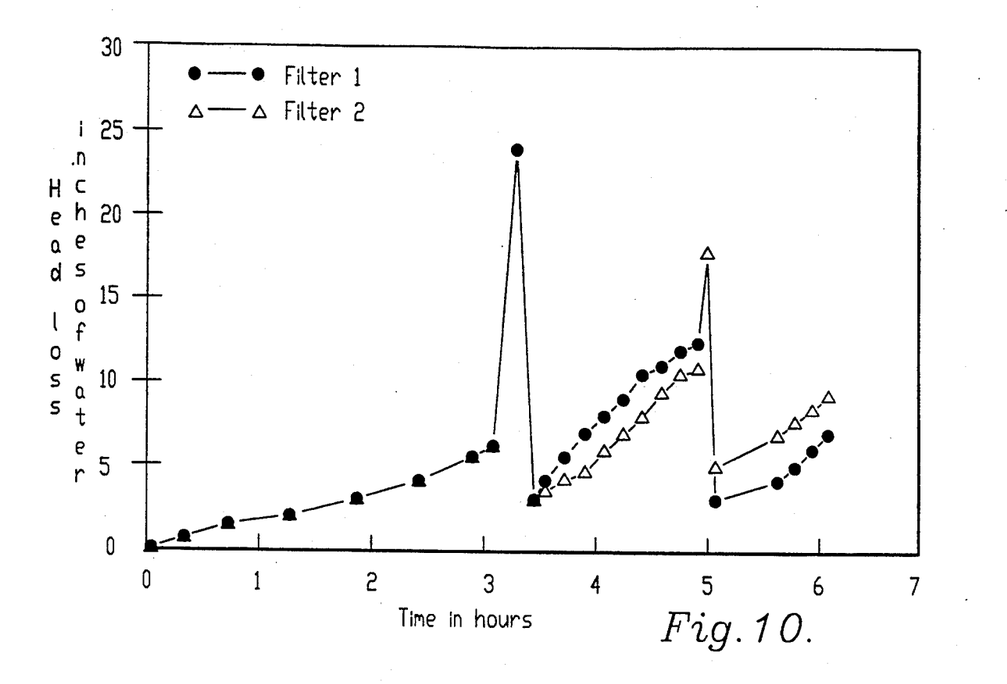
FIG. 10 is a diagram illustrating a comparison of pressure head loss curves for variable declining rate filtration for two tapered bed filtration apparatuses.

A comparison of pressure head loss curves for variable declining rate filtration between two conventional cylindrical beds and two tapered beds as in Example 4 is set forth in FIGS. 8 and 10. The cylindrical beds were those utilized in making the various comparative tests with the tapered bed devices discussed in Examples 1–5 inclusive. In the illustrated example, the rate of flow through each bed was 4 gpm/sq.ft., the ferric sulfate dosage was 10 mg/l, and influent turbidity measured 15 NTU in the cylindrical beds and 16 NTU in the tapered beds. The diagram makes plain that the performance characteristics of the cylindrical beds used as a basis for comparison with the tapered beds conform with one another.

Example 7

Figure 9:
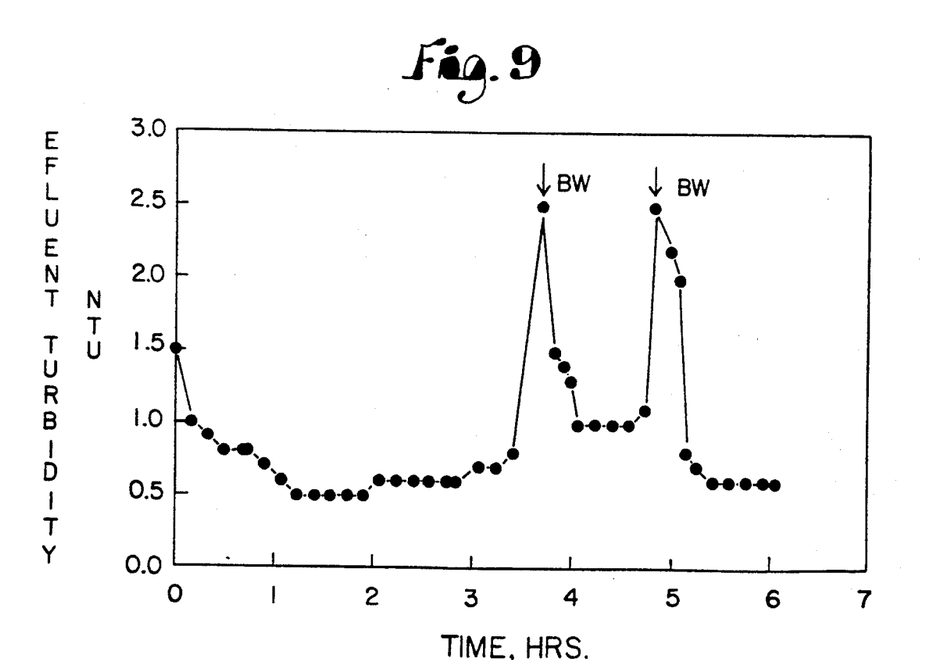
FIG. 9 is a diagram illustrating the relative effluent turbidity curves for the conventional cylindrical filters both operated in the variable declining rate filtration mode.
Figure 11:
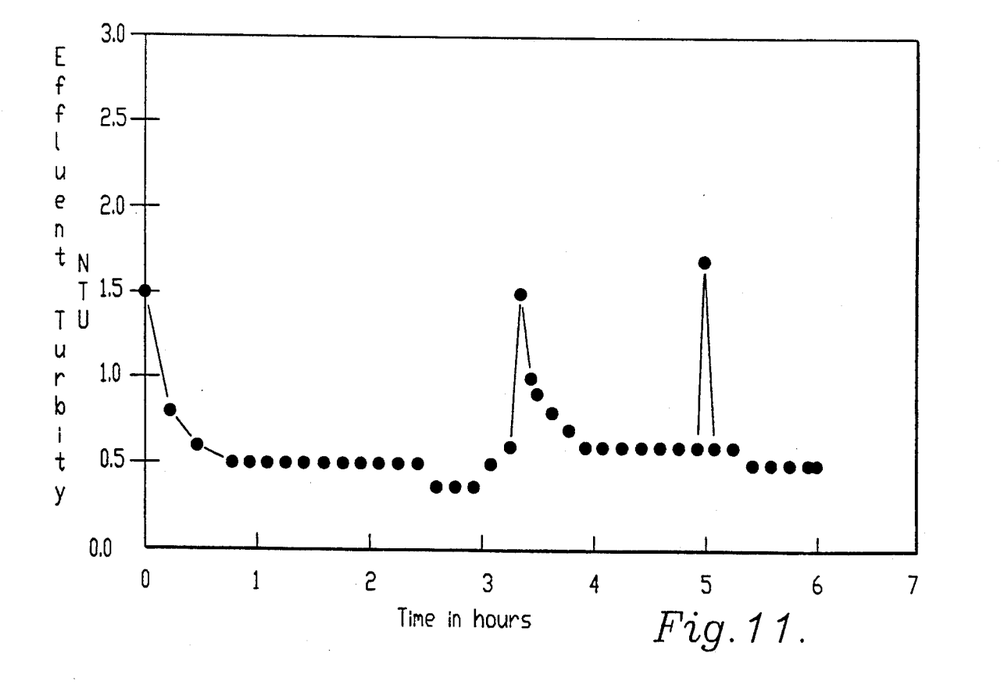
FIG. 11 is a diagram illustrating the effluent turbidity curves for the two tapered bed filtration apparatuses operated in the variable declining rate filtration mode.

As in the previous example, Example 7 illustrates a comparison between the two conventional cylindrical filter beds used in the comparative tests with the tapered beds illustrated in Example 4. In this case, effluent turbidity curves are compared, where the flow rate and influent turbidity levels were the same as in Example 6. FIG. 9 and 11 set forth the test results, and again illustrates that the performance characteristics of the present invention are better than conventional cylindrical beds under a range of conditions.

Although the invention has been described with reference to the illustrated preferred embodiment, it is noted that variations and changes may be made and equivalents employed herein without departing from the scope of the invention as recited in the claims. For example, multiple filter units may be constructed with common walls to provide compact tapered bed filtration systems that may be operated either in parallel or series with one another. Such multiple units may be operated in both upflow and downflow modes, or as a combination of the two. Also, annular-type, variable-area beds may be constructed to provide the advantageous effects noted with respect to the illustrated preferred embodiment.

I claim:

1. A filter apparatus comprising:
an upright casing defining an inlet and an outlet, and having upper and lower ends and a peripheral wall extending between the inlet and outlet, the peripheral wall defining a filtration chamber having a longitudinal axis and a transverse cross-sectional area which increases between the inlet and the outlet;
a bed of particulate filtering media within the chamber and including at least one layer of media having a specified, common density, the media within said at least one layer ranging in size between relatively large particles and relatively small particles, the media within said at least one layer being distributed by particle size within the chamber, with the large particles being disposed closer to said inlet and with smaller particles being disposed closer to the outlet so that the particle size of the media of said at least one layer in the chamber decreases from the inlet toward the outlet while the transverse cross-sectional area of the chamber increases; and
fluid delivery means operably coupled with said casing for delivery of unfiltered fluid to said inlet for passage of unfiltered fluid from the inlet to the outlet through said chamber in order to filter the initially unfiltered fluid, and for alternate delivery of backwashing fluid to the lower end of said chamber for passage of backwashing fluid upwardly through the chamber in order to fluidize the bed of particulate filtering media for cleaning thereof.

2. A filter apparatus as recited in claim 1, wherein the cross-sectional area of the chamber continuously increases between the inlet and the outlet along the length of the bed.

3. A filter apparatus as recited in claim 1, wherein the cross-sectional area of the chamber increases at a substantially constant rate between the inlet and the outlet along the length of the bed.

4. A filter apparatus as recited in claim 1, wherein the cross-sectional area of the chamber at any position along the longitudinal axis is polygonal.

5. A filter apparatus as recited in claim 1, wherein the cross-sectional area of the chamber at any position along the longitudinal axis is circular.

6. A filter apparatus as recited in claim 1, wherein the inlet is disposed at the top of the chamber and the outlet is positioned at the bottom of the chamber, and the larger particles are supported above the smaller particles.

7. A filter apparatus as recited in claim 1, wherein all of the particles making up said bed have a common density, said bed having only a single layer.

8. A filter apparatus as recited in claim 7, wherein the material is selected from the group consisting of anthracite, coal, garnet, sand, activated carbon, inert plastics and ilmenite.

9. A filter apparatus as recited in claim 1, wherein the particulate filtering media is selected from a plurality of different types of material having different densities, each of said different density materials being arranged in a different layer of said bed, with large and heavy particles of each layer being disposed closer to the inlet and with smaller and lighter particles of each layer being disposed distal to the outlet such that the particle distribution by weight and size of each layer corresponds inversely with the cross-sectional area of the chamber.

10. A filter apparatus as recited in claim 1, wherein the inlet is disposed at the bottom of the chamber and the outlet is positioned at the top of the chamber, and the larger, heavier particles are supported beneath the smaller, lighter particles, said fluid delivering means being operable for said alternate delivery of said backwashing fluid to said inlet for upward flow through said chamber.

* * * * *